United States Patent
Chung et al.

(10) Patent No.: US 10,025,110 B2
(45) Date of Patent: Jul. 17, 2018

(54) AUTOSTEREOSCOPIC IMAGE DISPLAY AND METHOD FOR DRIVING THE SAME

(71) Applicant: LG DISPLAY CO., LTD., Seoul (KR)

(72) Inventors: Bogyun Chung, Goyang-si (KR); Chunghwan An, Seoul (KR); Kyungah Chin, Paju-si (KR); Taejoon Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 370 days.

(21) Appl. No.: 14/073,617

(22) Filed: Nov. 6, 2013

(65) Prior Publication Data

US 2014/0125783 A1    May 8, 2014

(30) Foreign Application Priority Data

Nov. 8, 2012   (KR) ........................ 10-2012-0126043

(51) Int. Cl.
```
H04N 13/04    (2006.01)
G02B 27/22    (2018.01)
G09G 3/00     (2006.01)
G09G 3/36     (2006.01)
G09G 3/20     (2006.01)
```

(52) U.S. Cl.
CPC ......... *G02B 27/2214* (2013.01); *G09G 3/003* (2013.01); *G09G 3/3614* (2013.01); *H04N 13/0404* (2013.01); *H04N 13/0413* (2013.01); *H04N 13/0497* (2013.01); *G09G 3/2022* (2013.01); *G09G 2320/0204* (2013.01); *G09G 2320/0247* (2013.01); *G09G 2340/16* (2013.01); *H04N 13/0422* (2013.01)

(58) Field of Classification Search
CPC .......... H04N 13/0404; H04N 13/0409; H04N 13/0402

See application file for complete search history.

(56) References Cited

U.S. PATENT DOCUMENTS

| | | | | |
|---|---|---|---|---|
| 9,100,645 | B2 * | 8/2015 | Hwang | H04N 13/0438 |
| 9,135,845 | B2 * | 9/2015 | Lee | G09G 3/003 |
| 2008/0259063 | A1 * | 10/2008 | Kim | H04N 13/0409 345/204 |
| 2008/0259233 | A1 * | 10/2008 | Krijn | H04N 13/0029 349/15 |
| 2009/0046143 | A1 * | 2/2009 | Hiddink | G02B 3/14 348/59 |
| 2010/0097449 | A1 * | 4/2010 | Jeong | G02B 27/2214 348/59 |

(Continued)

FOREIGN PATENT DOCUMENTS

CN    101290758 A    10/2008

*Primary Examiner* — Tat C Chio
*Assistant Examiner* — Fabio S Lima
(74) *Attorney, Agent, or Firm* — Birch, Stewart, Kolasch & Birch, LLP

(57) ABSTRACT

An autostereoscopic display and a method for driving the same are discussed. The autostereoscopic display according to an embodiment includes a display panel displaying data of a left eye image and data of a right eye image and a three-dimensional (3D) cell which is positioned on the display panel or is embedded in the display panel and separates optical axes of the left eye image and the right eye image. A frame rate of the 3D cell is greater than a frame rate of the display panel.

19 Claims, 19 Drawing Sheets

(56) References Cited

U.S. PATENT DOCUMENTS

| | | | | |
|---|---|---|---|---|
| 2011/0141382 A1* | 6/2011 | Okita | ............. | H04N 13/0438 349/13 |
| 2011/0242442 A1* | 10/2011 | Lee | ............. | G02B 27/2214 349/15 |
| 2012/0154556 A1* | 6/2012 | An | ............. | G02B 27/2214 348/51 |
| 2012/0169949 A1* | 7/2012 | Son | ............. | G02B 6/0056 349/15 |
| 2013/0229327 A1* | 9/2013 | Lee | ............. | G02B 27/2214 345/58 |
| 2013/0265320 A1* | 10/2013 | Yamazaki | ............. | G09G 5/02 345/589 |
| 2014/0146143 A1* | 5/2014 | Park | ............. | H04N 13/0415 348/51 |

* cited by examiner

AUTOSTEREOSCOPIC IMAGE DISPLAY AND METHOD FOR DRIVING THE SAME

This application claims the priority benefit of Korean Patent Application No. 10-2012-00126043 filed on Nov. 8, 2012, the entire contents of which is incorporated herein by reference for all purposes as if fully set forth herein.

BACKGROUND OF THE INVENTION

Field of the Invention

Embodiments of the invention relate to an autostereoscopic display and a method for driving the same.

Discussion of the Related Art

As stereoscopic image reproduction technology is applied to display devices, such as a television and a monitor, with the development of stereoscopic image display technology, now is the age in which people can easily view three-dimensional (3D) stereoscopic images even at home. A 3D display may be classified into a stereoscopic display and an autostereoscopic display called a glasses-free 3D display. The stereoscopic display displays a parallax image between the left and right eyes on a direct-view display or a projector through changes in a polarization direction of the parallax image or in a time-division manner and thus implements a stereoscopic image using polarization glasses or liquid crystal shutter glasses. The autostereoscopic display implements the stereoscopic image by installing an optical part, such as a parallax barrier (hereinafter referred to as "barrier") and a lenticular lens (hereinafter referred to as "lens"), for separating an optical axis of the parallax image in front of or behind a display screen.

Not only a technology for forming the barrier or the lens using a fixed optical film but also a 3D cell implementing the barrier and the lens by adjusting a voltage applied to a liquid crystal layer have been recently developed. The 3D cell is defined as an optical part for separating optical axes of left eye image data and right eye image data of 3D image data using an electrically controllable liquid crystal layer. A viewer sees pixels, on which a left eye image is displayed, through his or her left eye and sees pixels, on which a right eye image is displayed, through his/her right eye using the 3D cell, thereby feeling binocular disparity. The 3D cell may be implemented as a switchable barrier or a switchable lens. The switchable barrier and the switchable lens were disclosed in U.S. patent application Ser. No. 13/077,565 (2011 Mar. 31) and Ser. No. 13/325,272 (2011 Dec. 14) corresponding to the present applicant, and which are hereby incorporated by reference in their entirety.

When DC voltage is applied to liquid crystal molecules for a long time, the liquid crystal molecules are degraded due to an unwanted electrochemical reaction of the liquid crystal molecules, and image sticking is generated. To prevent the problems, a liquid crystal layer of a liquid crystal display and a liquid crystal layer of the 3D cell are driven using an alternating current (AC) voltage of which a polarity is periodically inverted. For example, a positive voltage is applied to liquid crystal cells in odd-numbered frame periods, and a negative voltage is applied to the liquid crystal cells in even-numbered frame periods. However, when the liquid crystal layer of the 3D cell is driven using the AC voltage, a kickback voltage varies depending on a polarity of the voltage applied to the liquid crystal layer of the 3D cell in the same manner as the liquid crystal display. Therefore, a flicker may appear in a cycle in which voltages of the same polarity repeat. If the flicker of the liquid crystal display is synchronized with the flicker of the 3D cell, an intensity of the flicker may further increase. Even if an image displayed on the liquid crystal display has the excellent display quality, a stereoscopic image may be degraded due to the flicker of the switchable barrier or the switchable lens.

SUMMARY OF THE INVENTION

Embodiments of the invention provide an autostereoscopic display and a method for driving the same capable of preventing a flicker.

An autostereoscopic display according to the embodiments of the invention includes a display panel configured to display data of a left eye image and data of a right eye image and a three-dimensional (3D) cell which is positioned on the display panel or is embedded in the display panel and separates optical axes of the left eye image and the right eye image. A frame rate of the 3D cell is greater than a frame rate of the display panel.

A method for driving the autostereoscopic display according to the embodiments of the invention includes causing a frame rate of the 3D cell to be greater than a frame rate of the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Before describing embodiments of the invention, some terms used in the embodiments of the invention are defined as follow.

An autostereoscopic display according to the embodiment of the invention may be implemented based on a flat panel display, such as a liquid crystal display (LCD), a field emission display (FED), a plasma display panel (PDP), an organic light emitting display, and an electrophoresis display (EPD).

Figure 1:
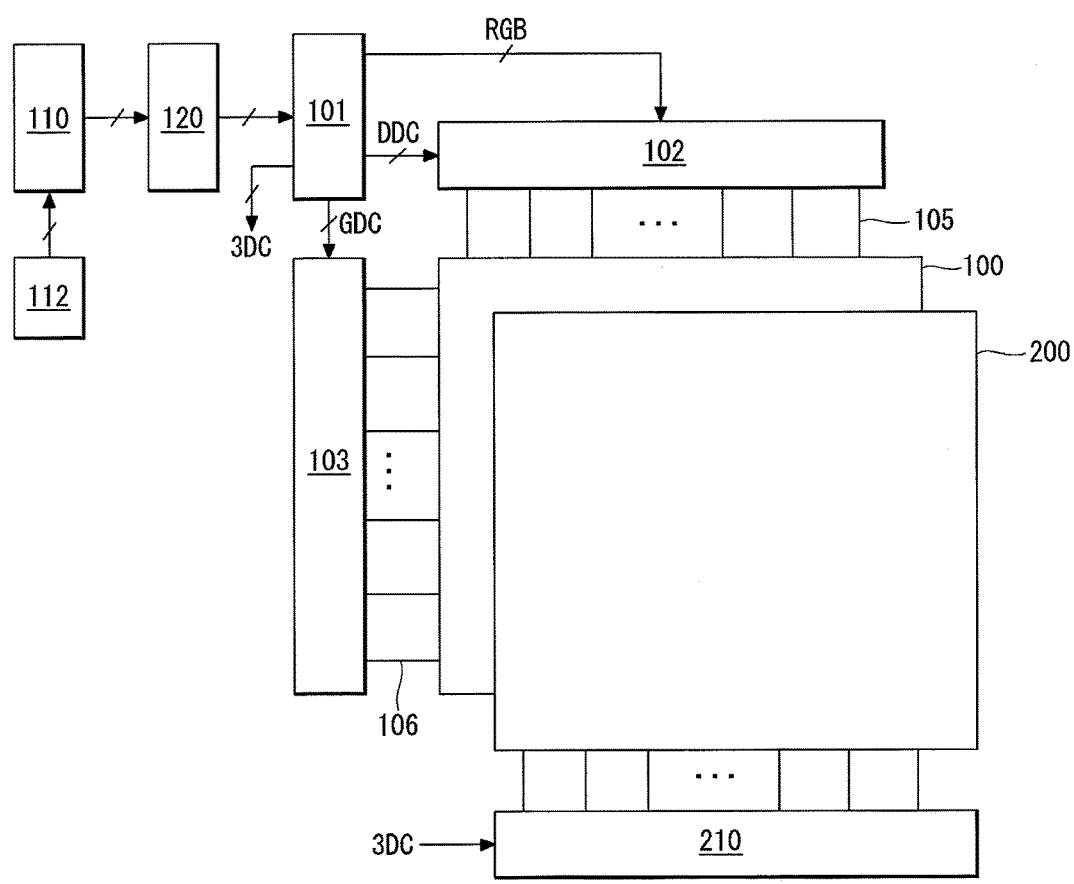
FIG. 1 is a block diagram of an example of an autostereoscopic display according to a first embodiment of the present invention.
Figure 2:
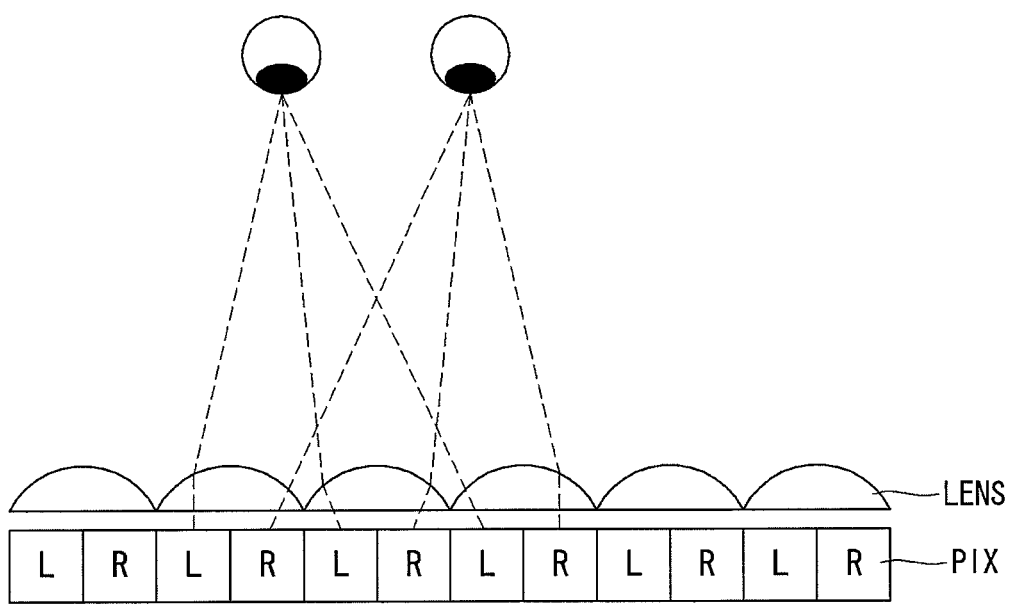
FIG. 2 is a cross-sectional view showing a lens of the autostereoscopic display.
Figure 3:
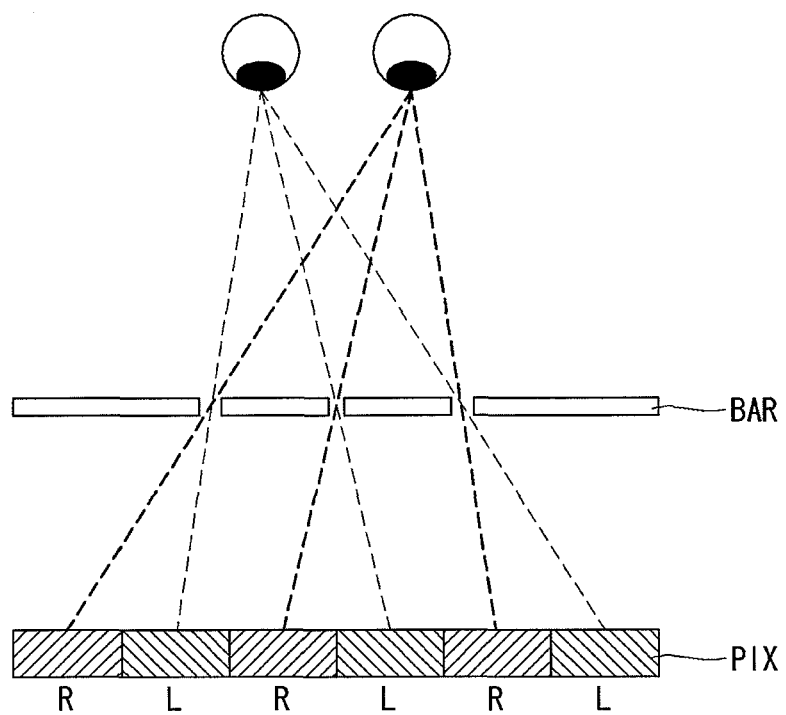
FIG. 3 is a cross-sectional view showing a barrier of the autostereoscopic display.

FIGS. 1 to 3 illustrate an autostereoscopic display including a display panel 100, a display panel driver, a 3D cell 200, a 3D cell driver 210, and a timing controller 101. All components of the autostereoscopic display in this embodiment and other embodiments are operatively coupled and configured.

As shown in FIGS. 1 to 3, the display panel 100 includes a pixel array PIX including pixels arranged in a matrix form based on a crossing structure of data lines 105 and gate lines (or scan lines) 106 orthogonal to the data lines 105. Each of the pixels may include subpixels of different colors. The pixel array PIX displays a 2D image in a 2D mode and dividedly displays a left eye image and a right eye image in a 3D mode.

The display panel driver includes a data driving circuit 102 for supplying data voltages of the 2D and 3D images to the data lines 105 of the display panel 100 and a gate driving circuit 103 for sequentially supplying a gate pulse (or scan pulse) to the gate lines 106 of the display panel 100. In the 3D mode, the display panel driver may spatially distribute and write left eye image data and right eye image data, which are input as data of a multi-view image data format, to the pixels of the display panel 100.

The data driving circuit 102 converts digital video data RGB received from the timing controller 101 into analog gamma voltages and generates the data voltages. The data driving circuit 102 then supplies the data voltages to the data lines 105 of the display panel 100. The gate driving circuit 103 supplies the gate pulse synchronized with the data voltage to the gate lines 106 under the control of the timing controller 101 and sequentially shifts the gate pulse.

The 3D cell 200 may be implemented as a switchable lens LENS or a switchable barrier BAR shown in FIGS. 2 to 6. The 3D cell 200 may be attached to the front or the rear of the display panel 100 or may be embedded in the display panel 100. The 3D cell 200 separates optical axes of the left eye image data and the right eye image data of 3D image data. The switchable lens LENS or the switchable barrier BAR includes a birefringent medium such as liquid crystal, an electrode, etc. The switchable lens LENS or the switchable barrier BAR is electrically driven by the 3D cell driver 210 and separates optical axes of light of a left eye image and a right eye image. A liquid crystal layer of the 3D cell 200 rotatively moves liquid crystal molecules and adjusts refractive indexes of the liquid crystal molecules depending on a level of a voltage applied through the electrode, thereby forming a barrier blocking light or a lens refracting light like a curved surface of a lens using a difference between refractive indexes of liquid crystals.

Figure 4:
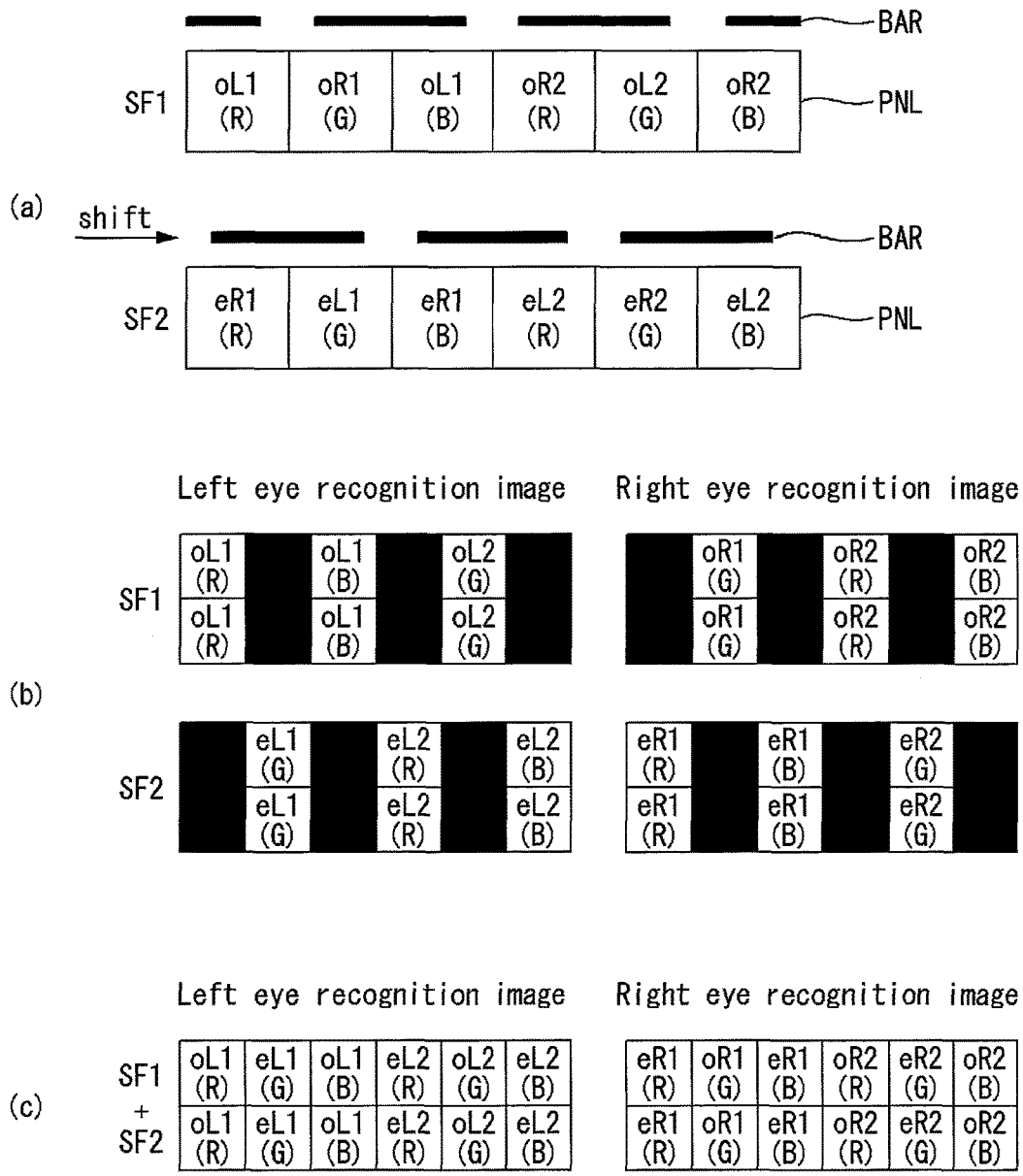
FIGS. 4 and 5 illustrate an example of a method for driving the autostereoscopic display capable of implementing a stereoscopic image without a loss of a resolution using a switchable barrier or a switchable lens.
Figure 5:
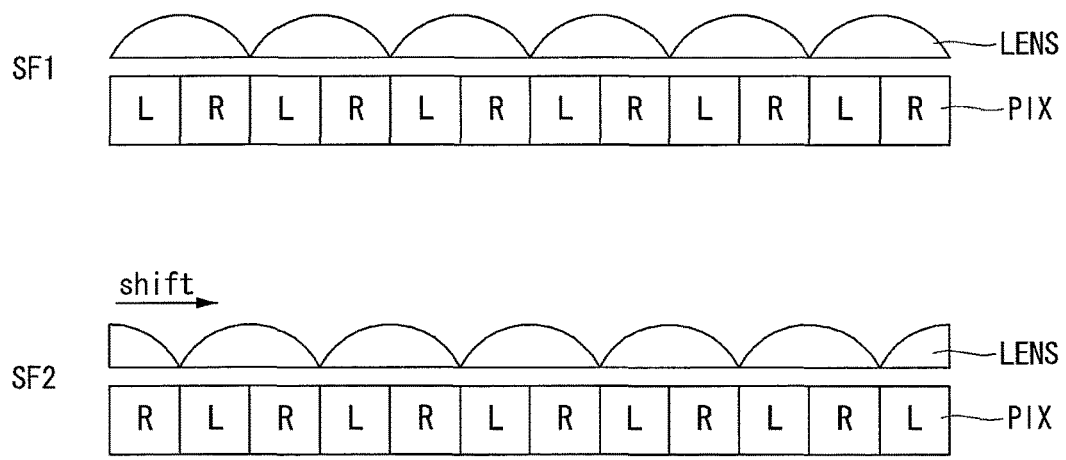

In the 3D mode, the 3D cell driver 210 shifts the switchable lens LENS or the switchable barrier BAR as shown in FIGS. 4 and 5 in synchronization with pixel data written to the pixel array PIX of the display panel 100 under the control of the timing controller 101.

The timing controller 101 supplies the digital video data RGB of the 2D and 3D input images received from a host system 110 to the data driving circuit 102. The timing controller 101 receives timing signals, such as a vertical sync signal, a horizontal sync signal, a data enable signal, and a main clock, from the host system 110 in synchronization with the digital video data RGB of the 2D and 3D input images. The timing controller 101 controls an operation timing of each of the display panel drivers 102 and 103 and the 3D cell driver 210 using the timing signals received from the host system 110 and generates timing control signals DDC, GDC, and 3DC for synchronizing the operation timings of the drivers 102, 103, and 210.

The timing controller 101 multiplies a frame rate of an input image by 'N' to obtain a frequency of (frame rate×N) Hz, where N is a positive integer equal to or greater than 2. Hence, the timing controller 101 may control an operation frequency of each of the display panel drivers 102 and 103 and the 3D cell driver 210 based on the frequency of (frame rate×N) Hz. The frame rate of the input image is 50 Hz in a phase alternate line (PAL) scheme and is 60 Hz in a national television standards committee (NTSC) scheme. In particular, the timing controller 101 causes a frame rate of the 3D cell 200 to be greater than a frame rate of the display panel 100, so as to prevent a flicker of the 3D cell 200 a user may feel. The frame rate of the 3D cell 200 may be N times greater than the frame rate of the display panel 100. For example, the timing controller 101 may control the frame rate of the display panel 100 to 120 Hz (or 100 Hz) and may control the frame rate of the 3D cell 200 to 240 Hz (or 200 Hz) which is two times greater than the frame rate of the display panel 100. When the frame rate of the input image (hereinafter referred to as "input frame rate") is 60 Hz (or 50 Hz), the timing controller 101 may increase the frame rate of the display panel 100 to a frequency corresponding to two times the input frame rate and may increase the frame rate of the 3D cell 200 to a frequency corresponding to four times the input frame rate.

A 3D data formatter 120 may be installed between the host system 110 and the timing controller 101. In the 3D mode, the 3D data formatter 120 rearranges the left eye image data and the right eye image data of the 3D image received from the host system 110 in conformity with the multi-view image data format and transmits the rearranged left and right eye image data to the timing controller 101. If 2D image data is input in the 3D mode, the 3D data formatter 120 may perform a previously determined 2D-to-3D image conversion algorithm, thereby producing left eye image data and right eye image data from the 2D image data. The 3D data formatter 120 may rearrange the left eye image data and the right eye image data in conformity with the multi-view image data format and may transmit the rearranged left and right eye image data to the timing controller 101.

The host system 110 may be implemented as one of a TV system, a set-top box, a navigation system, a DVD player, a Blu-ray player, a personal computer (PC), a home theater system, and a phone system. The host system 110 converts the digital video data of the 2D and 3D input images into a format suitable for a resolution of the display panel 100 using a scaler and transmits the converted digital video data and the timing signals to the timing controller 101.

The host system 110 supplies the 2D image to the timing controller 101 in the 2D mode and supplies the 3D image or the 2D image data to the 3D data formatter 120 in the 3D mode. The host system 110 transmits a mode signal to the timing controller 101 in response to user data received through a user interface 112 and thus may switch an operation mode of the autostereoscopic display to the 2D mode and the 3D mode. The user interface 112 may be implemented as a keypad, a keyboard, a mouse, an on-screen display (OSD), a remote controller, a graphic user interface (GUI), a touch user interface (UI), a voice recognition UI, or 3D UI, etc. The user may select the 2D mode and the 3D mode through the user interface 112 and also may select the 2D-to-3D image conversion through the user interface in the 3D mode.

FIGS. 4 and 5 illustrate an example of a method for driving the autostereoscopic display capable of implementing a stereoscopic image without a loss of a resolution using the switchable barrier or the switchable lens.

As shown in FIGS. 4 and 5, the autostereoscopic display can multiply the frame rate of the input image by 2 and increase the input frame rate.

As shown in (a) of FIG. 4, the autostereoscopic display can shift the pixel data written to the pixel array PIX in each frame period (i.e., each of frame periods SF1 and SF2) and also shift the barrier or the lens of the 3D cell 200 in synchronization with the pixel data. (b) of FIG. 4 illustrates a left eye recognition image and a right eye recognition image separated by the 3D cell 200.

(c) of FIG. 4 illustrates the left eye recognition image and the right eye recognition image accumulated during the first and second frame periods SF1 and SF2. As can be seen from (c) of FIG. 4, the autostereoscopic display may be implemented without a reduction in the resolution of the image by properly shifting the pixel data written to the 3D cell 200 and the display panel 100. In FIG. 4, 'oL1' and 'oL2' are left eye image data written to the pixels of the pixel array PIX during the odd-numbered frame period (i.e., the first frame period SF1), and 'oR1' and 'oR2' are right eye image data written to the pixels of the pixel array PIX during the odd-numbered frame period (i.e., the first frame period SF1). 'eL1 and eL2' are left eye image data written to the pixels of the pixel array PIX during the even-numbered frame period (i.e., the second frame period SF2), and 'eR1 and eR2' are right eye image data written to the pixels of the display panel PNL during the even-numbered frame period (i.e., the second frame period SF2).

Figure 6:
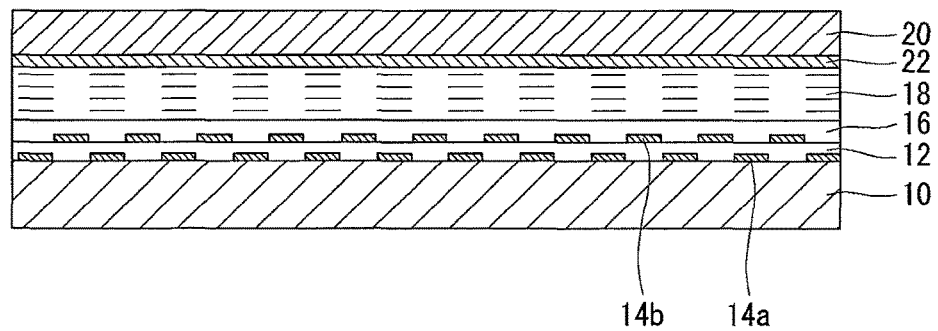
FIG. 6 is a cross-sectional view illustrating an example of a 3D cell shown in FIG. 1.

FIG. 6 is a cross-sectional view illustrating an example of the 3D cell 200.

As shown in FIG. 6, the 3D cell 200 includes a liquid crystal layer 18 formed between a lower substrate 10 and an upper substrate 20, divided lower electrodes 14a and 14b, an upper electrode 22 formed on the upper substrate 20, etc.

Each of the lower substrate 10 and the upper substrate 20 is manufactured using a transparent material. The electrodes 14a, 14b, and 22 are formed of a transparent electrode material, for example, indium tin oxide (ITO). The lower electrodes 14a and 14b may be separated into upper and lower layers by transparent insulating layers 12 and 16, so as to reduce a distance between electrode patterns and minutely control liquid crystal molecules of the liquid crystal layer 18. A level of a driving voltage applied to the lower electrodes 14a and 14b is set based on a driving method of the switchable lens LENS or the switchable barrier BAR, and the driving voltage may be independently applied. The driving voltage applied to the lower electrodes 14a and 14b is an alternating current (AC) driving voltage, of which a polarity is inverted at the same frequency as the frame rate of the 3D cell 200, so as to AC-drive the liquid crystal molecules. The upper electrode 22 is formed on the entire surface of the upper substrate 20 contacting the liquid crystal layer 18 in the form of a single layer. A common voltage Vcom, which is set to a DC voltage of a specific voltage level, is applied to the upper electrode 22.

Figure 7:
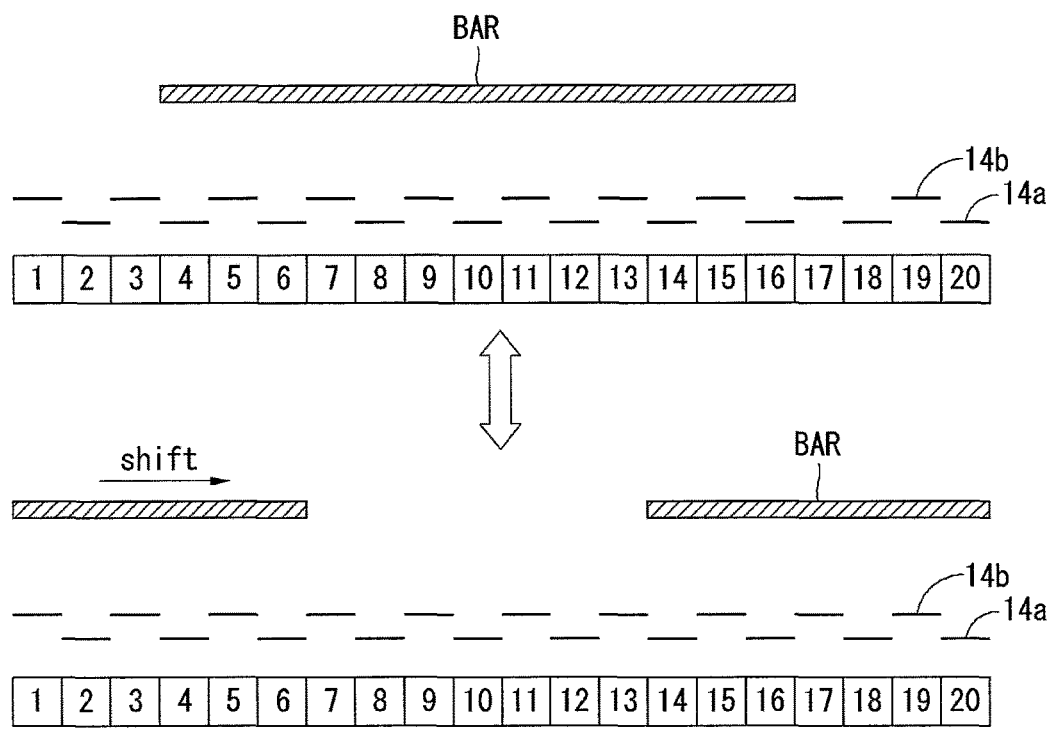
FIG. 7 illustrates an example of a shift operation of a barrier formed in the 3D cell.

As shown in FIG. 7, when the driving voltage applied to the lower electrodes 14a and 14b switches between a white gray voltage (or a high potential voltage) and a black gray voltage (or a low potential voltage), the switchable barrier BAR is shifted in each frame period.

FIGS. 8 to 17 illustrate examples of the voltage applied to the lower electrodes 14a and 14b. As shown in FIGS. 8-17, a frame rate of the 3D cell 200 can be greater than a frame rate of the display panel 100, so as to prevent the flicker of the 3D cell 200. Hence, the driving voltage shown in FIGS. 11 to 13, 16, and 17 can be supplied to the lower electrodes 14a and 14b to adjust the relative frame rate between the 3D cell 200 and the display panel 100.

The switchable lens LENS may be manufactured as a structure shown in FIG. 6 without a polarizing plate. In the switchable barrier BAR, a polarizing plate may be attached to each of the lower substrate 10 and the upper substrate 20.

Figure 8:
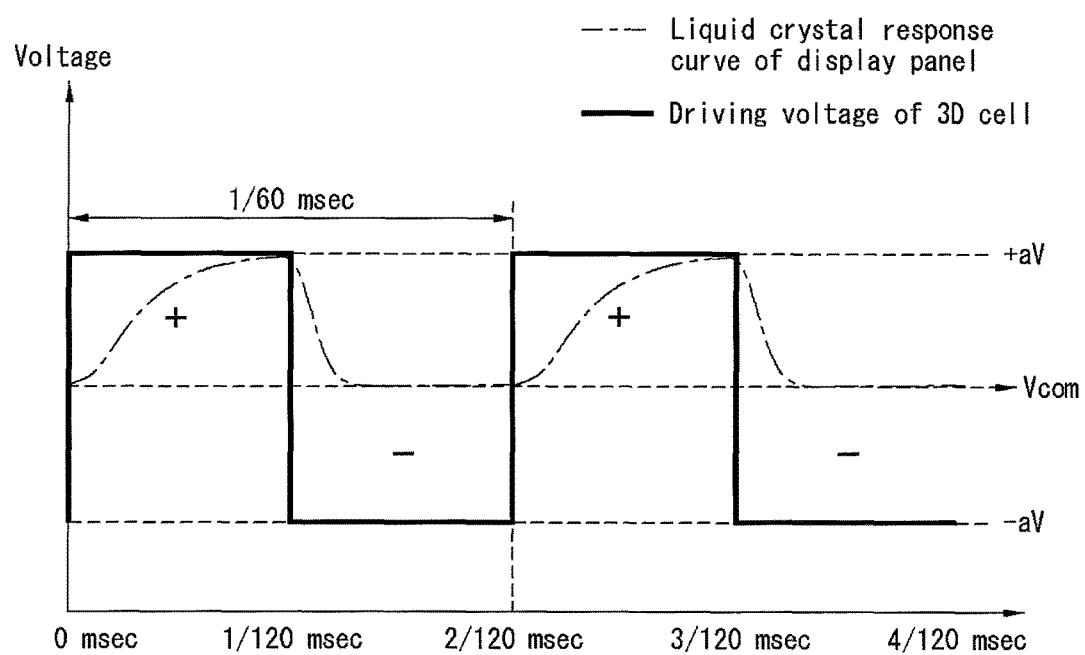
FIGS. 8 and 9 are waveform diagrams illustrating an example where a display panel and the 3D cell have the same frame rate.
Figure 9:
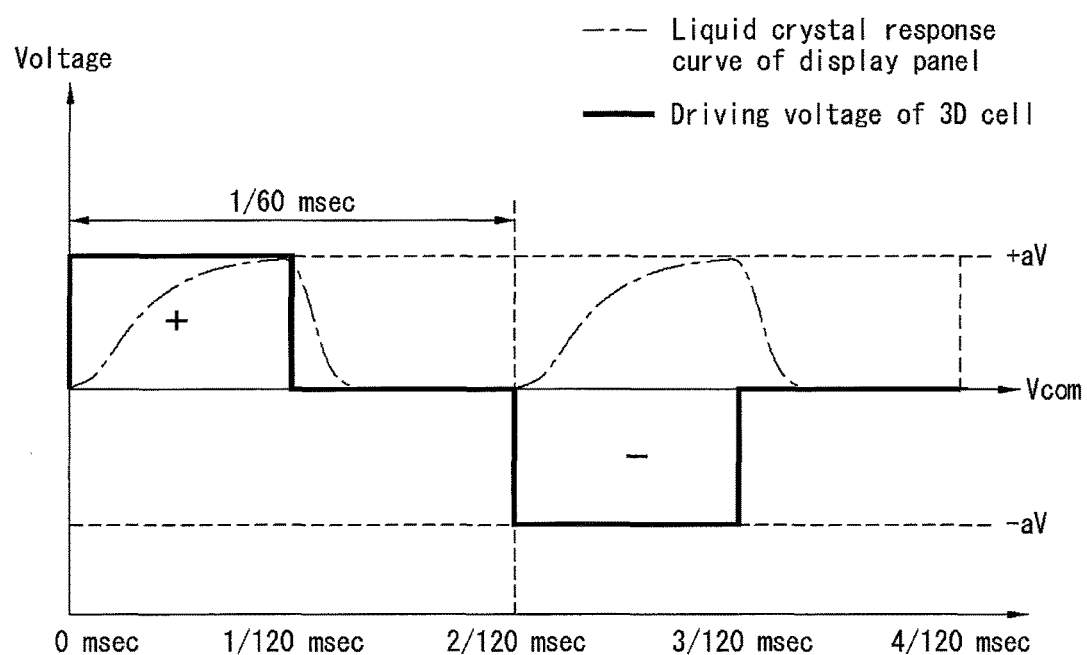
Figure 10:
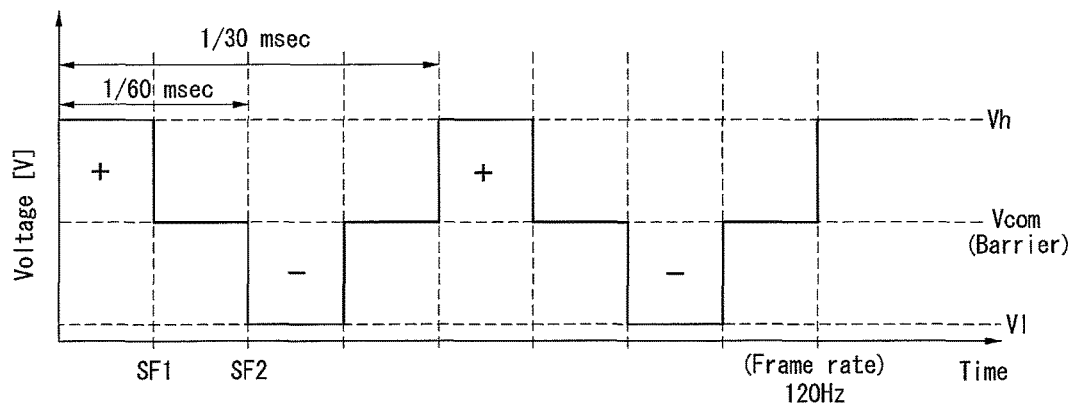
FIG. 10 is a waveform diagram showing 30 Hz flicker appearing in a driving method illustrated in FIG. 9.

FIGS. 8 to 10 illustrate an example of the driving voltage of the 3D cell 200 when the frame rate of the 3D cell 200 is equal to the frame rate of the display panel 100.

FIG. 8 illustrates the driving voltage applied to the 3D cell 200, in which the barrier or the lens is not shifted. In FIG. 8, the frame rate of the display panel 100 and the frame rate of the 3D cell 200 are 120 Hz. Thus, a polarity of a pixel data voltage of the display panel 100 and a polarity of the driving voltages +aV and −aV of the 3D cell 200 are inverted in each frame period (i.e., at intervals of 1/120 msec). In FIG. 8, '+aV' denotes a positive white gray voltage when the 3D cell 200 has a maximum light transmittance, and '−aV' denotes a negative white gray voltage when the 3D cell 200 has the maximum light transmittance.

When the barrier or the lens formed in the 3D cell 200 is shifted, the driving voltage shown in FIGS. 9 and 10 may be applied to the 3D cell 200. For example, as shown in FIG. 7, after the positive white gray voltage is applied to an electrode (denoted by "1" in FIG. 7) of the 3D cell 200 in a first frame period, the black gray voltage is applied to the "1" electrode of the 3D cell 200 in a second frame period. Subsequently, the negative white gray voltage may be applied to the "1" electrode of the 3D cell 200 in a third frame period. The black gray voltage is a voltage when the 3D cell 200 has a minimum light transmittance, and may be set to the same voltage as the common voltage Vcom of the 3D cell 200.

As shown in FIG. 9, when the 3D cell 200 is driven, the frame rate of the 3D cell 200 is 240 Hz. In this instance, a frequency of the white gray voltages +aV and −aV of different polarities is 60 Hz and is lower than the frame rate of the 3D cell 200, and also a frequency of the white gray voltages of the same polarity is 30 Hz and is further lowered. As shown in FIGS. 9 and 10, because the voltages of the same polarity are applied to the liquid crystal layer 18 of the 3D cell 200 at intervals of 1/30 msec, 30 Hz-flicker may appear in the 3D cell 200. The user may strongly feel the flicker as a flicker frequency is lowered.

In FIGS. 8 to 17, a polarity of the pixel data voltage of the display panel 100 is inverted at the frame rate frequency of 120 Hz. Thus, the liquid crystal molecules of the display panel 100 are inverted in each frame period (i.e., at intervals of 1/120 msec) as indicated by a liquid crystal response curve (indicated by dotted line) of FIGS. 8 to 17.

As shown in FIGS. 11 to 17, an autostereoscopic display according to a second embodiment of the present invention can cause the frame rate of the 3D cell 200 to be greater than the frame rate of the display panel 100, so as to reduce the flicker of the 3D cell 200. In examples illustrated in FIGS. 11 to 17, while the frame rate of the display panel 100 is 120 Hz, the frame rate of the 3D cell 200 is 240 Hz and is two times greater than the frame rate of the display panel 100. In this instance, one frame period of the display panel 100 is 1/120 msec, and one frame period of the 3D cell 200 is 1/240 msec. Hereinafter, the frame period of the display panel 100 is referred to as a display frame period, and the frame period of the 3D cell 200 is referred to as a 3D cell frame period.

In the example illustrated in FIG. 7, when the barrier BAR of the 3D cell 200 is shifted, the white gray voltage is applied to the "1" electrode of the 3D cell 200 during odd-numbered display frame periods. Then, the black gray voltage has to be applied to the "1" electrode of the 3D cell 200 during even-numbered display frame periods.

Figure 11:
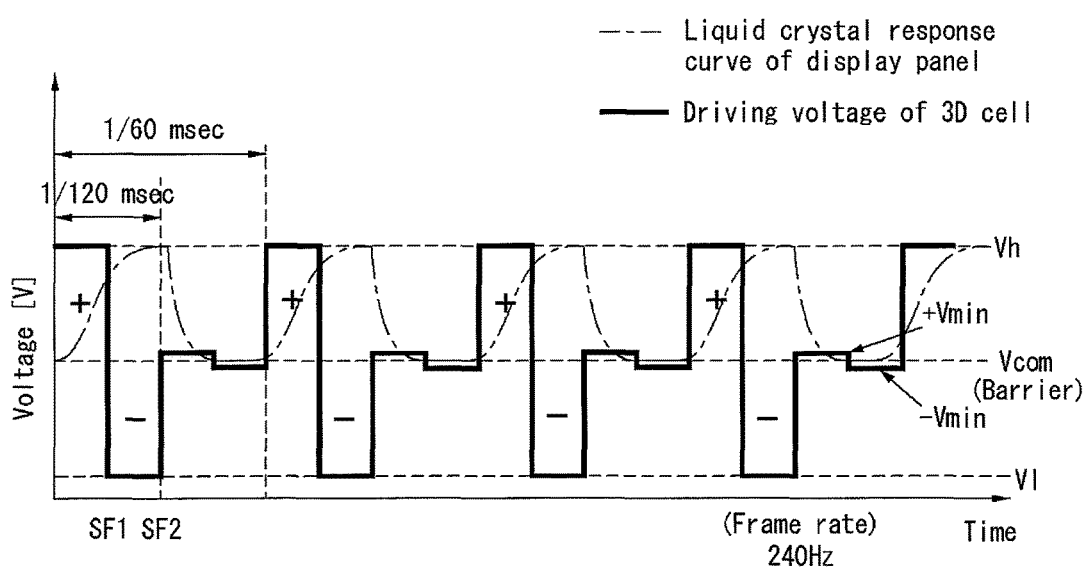
FIGS. 11 to 13 illustrate a driving voltage of the 3D cell and a liquid crystal response curve of a display panel in an autostereoscopic display according to a second embodiment of the present invention.
Figure 12:
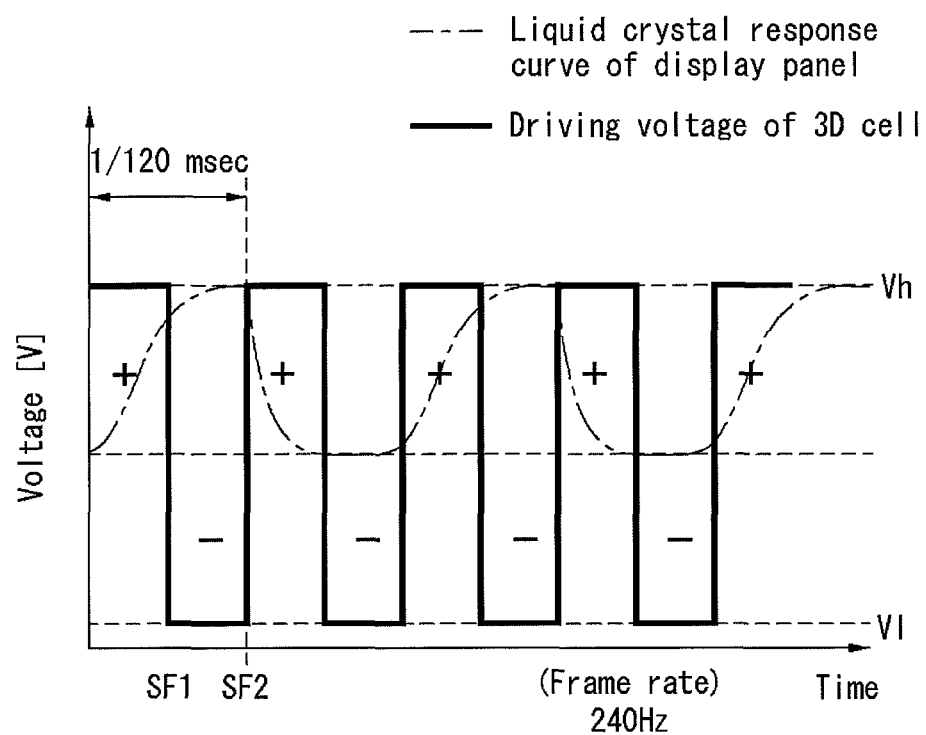
Figure 13:
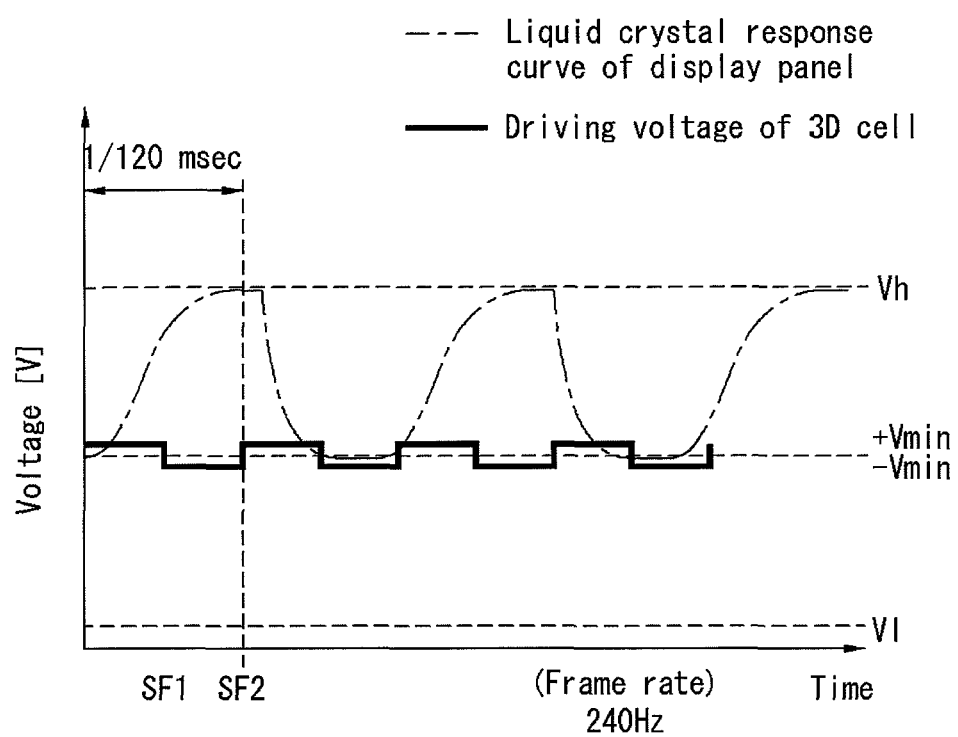

As shown in FIGS. 11 to 13, the frame rate of the 3D cell 200 can be two times greater than the frame rate of the display panel 100. Thus, the 3D cell 200 is driven in first and second 3D cell frame periods during one display frame period.

When a shift operation of the switchable barrier BAR shown in FIG. 7 as the 3D cell 200 is implemented, a driving voltage Vdrv of the 3D cell 200 shown in FIG. 11 is applied to the 1 to 3 and 17 to 20 electrodes of the 3D cell 200. When the shift operation of the switchable barrier BAR shown in FIG. 7 is implemented, the driving voltage Vdrv, which is generated in antiphase of the driving voltage Vdrv shown in FIG. 11, is applied to the 7 to 13 electrodes of the 3D cell 200. FIG. 12 illustrates the driving voltage Vdrv at which the transmittance of the 3D cell 200 is held to a maximum value during the odd-numbered 3D cell frame period and the even-numbered 3D cell frame period. FIG. 13 illustrates the driving voltage Vdrv at which the transmittance of the 3D cell 200 is held to a minimum value during the odd-numbered 3D cell frame period and the even-numbered 3D cell frame period. When the shift operation of the switchable barrier BAR shown in FIG. 7 is implemented, the driving voltage Vdrv shown in FIG. 13 may be applied to the 4 to 6 and 14 to 16 electrodes of the 3D cell 200.

In the example illustrated in FIG. 11, the positive data voltage is supplied to the pixels during a first display frame period. During the first display frame period, the frame period of the 3D cell 200 is divided into first and second 3D cell frame periods. During the first and second 3D cell frame periods, a polarity of the driving voltage of the 3D cell 200 is inverted once. After a positive white gray voltage Vh is applied to the "1" electrode of the 3D cell 200 during the first 3D cell frame period, a negative white gray voltage Vl is applied to the "1" electrode of the 3D cell 200 during the second 3D cell frame period. Thus, light passes through the liquid crystal layer on the "1" electrode during the first and second 3D cell frame periods. As shown in FIG. 7, a portion of the 3D cell 200, to which the positive and negative white gray voltages are applied, operating as the switchable barrier BAR corresponds to an opening which transmits light between the barriers.

Subsequently, the negative data voltage is supplied to the pixels during a second display frame period. During the second display frame period, the frame period of the 3D cell 200 is divided into third and fourth 3D cell frame periods. During the third and fourth 3D cell frame periods, a polarity of the driving voltage of the 3D cell 200 is inverted once. After a positive black gray voltage is applied to the "1" electrode of the 3D cell 200 during the third 3D cell frame period, a negative black gray voltage is applied to the "1" electrode of the 3D cell 200 during the fourth 3D cell frame period. The positive black gray voltage may be set to a voltage between a positive critical voltage +Vmin and the common voltage Vcom of the 3D cell 200. The negative black gray voltage may be set to a voltage between the common voltage Vcom of the 3D cell 200 and a negative critical voltage −Vmin. The positive critical voltage +Vmin is a maximum voltage within the range of the positive black gray voltage which the user recognizes as a black gray level, and the negative critical voltage −Vmin is a minimum voltage within the range of the negative black gray voltage which the user recognizes as the black gray level. Thus, light does not pass through the liquid crystal layer on the "1" electrode during the third and fourth 3D cell frame periods. As shown in FIG. 7, a portion of the 3D cell 200, to which the positive and negative black gray voltages are applied, operating as the switchable barrier BAR serves as a barrier for blocking light.

The autostereoscopic display according to the second embodiment of the present invention can increase the frame rate of the 3D cell 200, as shown in FIGS. 11 to 17, thereby preventing the flicker of the 3D cell 200. Further, the autostereoscopic display can AC-drive all the liquid crystal molecules of the 3D cell 200 although the driving voltage of the 3D cell 200 is any kind of voltage, thereby preventing the degradation of liquid crystals resulting from the DC drive.

Figure 14:
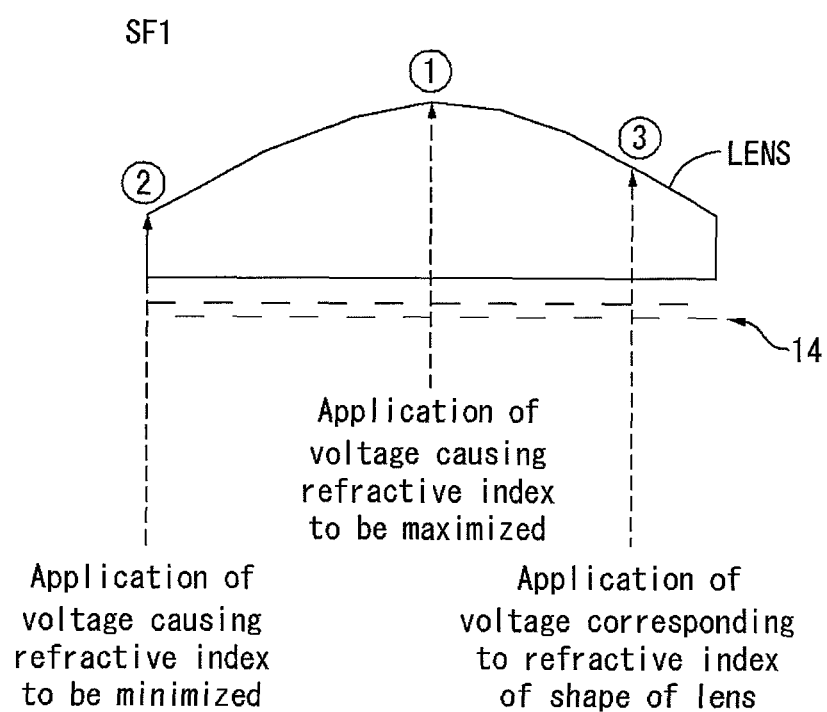
FIGS. 14 and 15 illustrate a relationship between a refractive index of a switchable lens in the autostereoscopic display and a driving voltage applied to the switchable lens.
Figure 15:
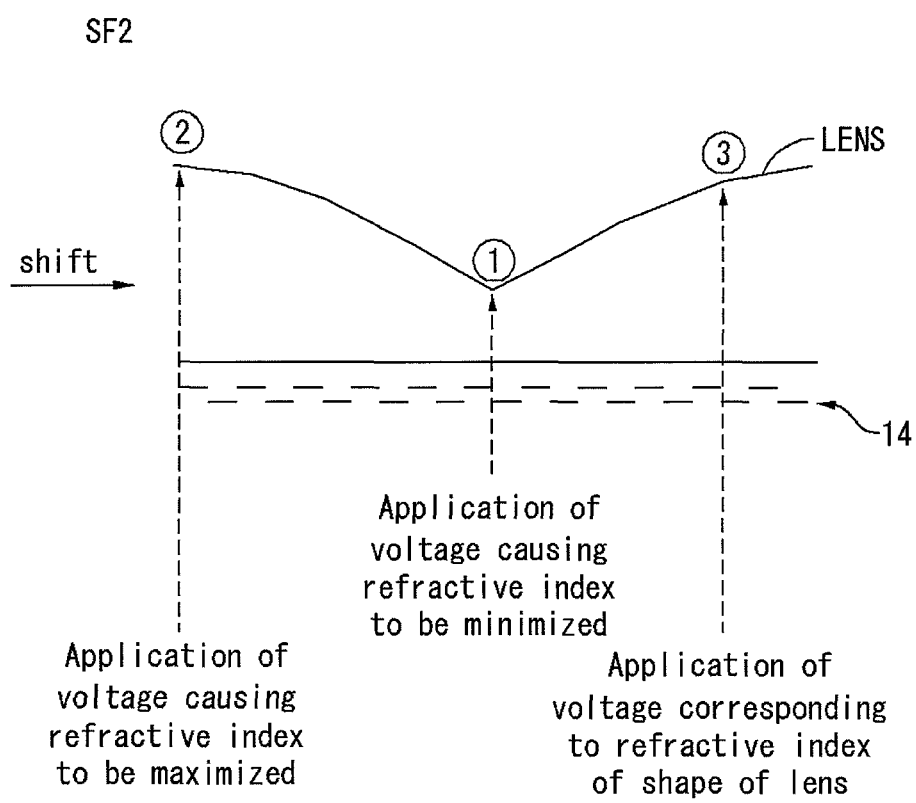

FIGS. 14 and 15 illustrate a relationship between a refractive index of the switchable lens LENS in the autostereoscopic display and a driving voltage applied to the switchable lens.

As shown in FIGS. 14 and 15, the switchable lens LENS is shifted in each frame period due to changes in the driving voltage.

Figure 16:
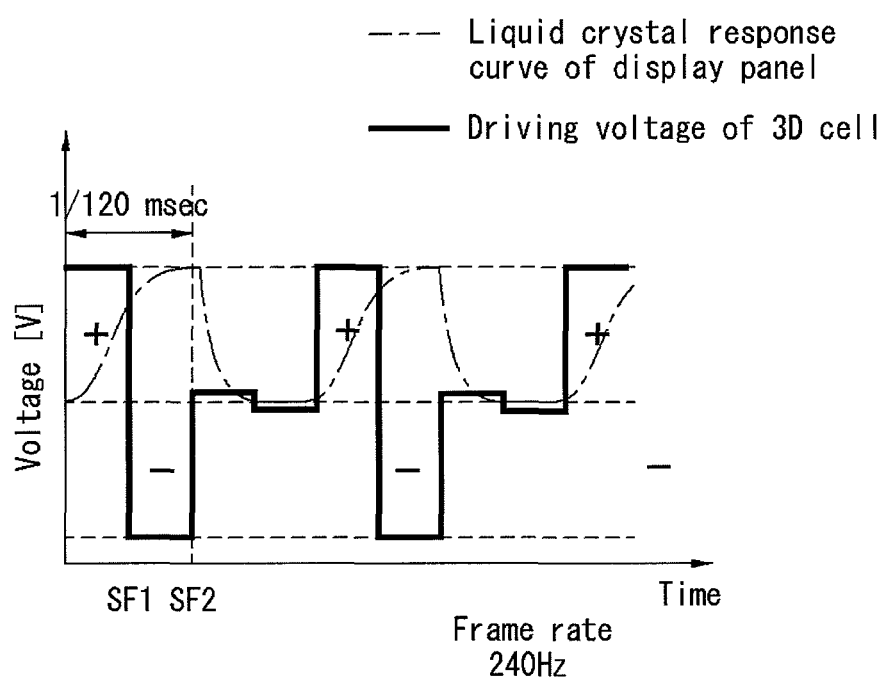
FIGS. 16 and 17 illustrate a driving voltage of a 3D cell and a liquid crystal response curve of a display panel in the autostereoscopic display.
Figure 17:
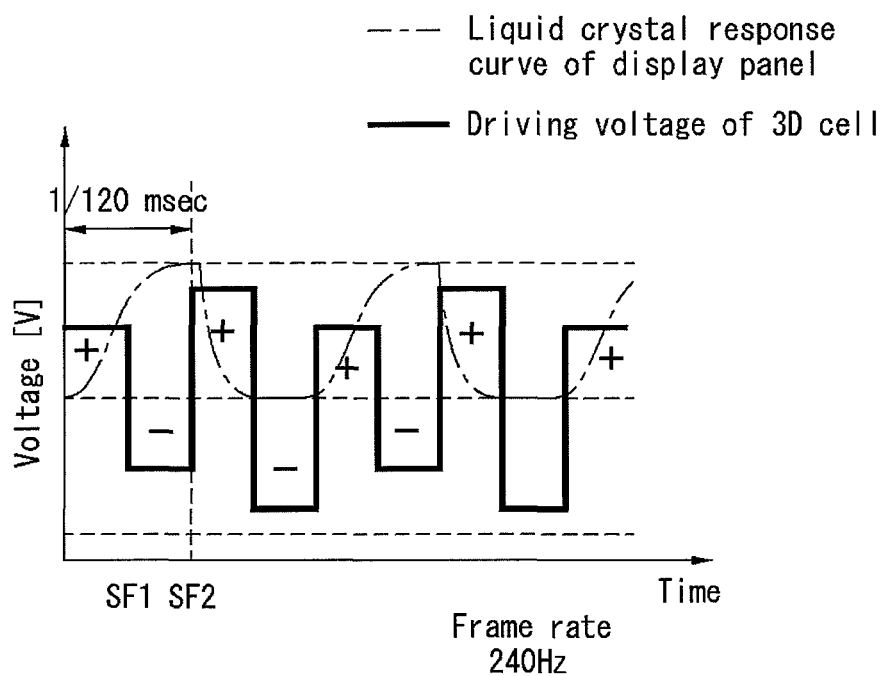

A voltage causing the switchable lens LENS to have a maximum refractive index is applied to the liquid crystal layer 18 of a convex portion ① of a curved surface of the switchable lens LENS, and a voltage causing the switchable lens LENS to have a minimum refractive index is applied to the liquid crystal layer 18 of a concave portion ② of the curved surface. A voltage implementing a refractive index corresponding to the shape of the curved surface is applied to a portion ③ between the convex portion ① and the concave portion ②. In the positive liquid crystal, when light is incident in a long axis direction of the liquid crystal molecule, the liquid crystal molecule has a maximum refractive index. Further, when light is incident in a short axis direction of the liquid crystal molecule, the liquid crystal molecule has a minimum refractive index. When the positive and negative white gray voltages are applied to the liquid crystal layer 18, the liquid crystal molecules are rotatively moved so that the liquid crystal molecules are vertically stood between the upper substrate and the lower substrate. Thus, as shown in FIG. 16, the driving voltage Vdrv applied to the liquid crystal layer 18 of the convex portion ① is the positive white gray voltage Vh and the negative white gray voltage Vl, so that the liquid crystal molecules have the maximum refractive index during the first and second 3D cell frame periods SF1 and SF2. Subsequently, as shown in FIG. 16, the positive black gray voltage and the negative black gray voltage are applied to the liquid crystal layer 18 of the convex portion ① during the third and fourth 3D cell frame periods. When the frame period of the 3D cell 200 is the first and second 3D cell frame periods SF1 and SF2, the frame period of the display panel 100 is the first display frame period. When the frame period of the 3D cell 200 is the third and fourth 3D cell frame periods, the frame period of the display panel 100 is the second display frame period. The driving voltage Vdrv applied to the liquid crystal layer 18 of the concave portion ② is the antiphase voltage of the voltage shown in FIG. 16. FIG. 17 illustrates the driving voltage Vdrv applied to the liquid crystal layer 18 of the portion ③.

Figure 18:
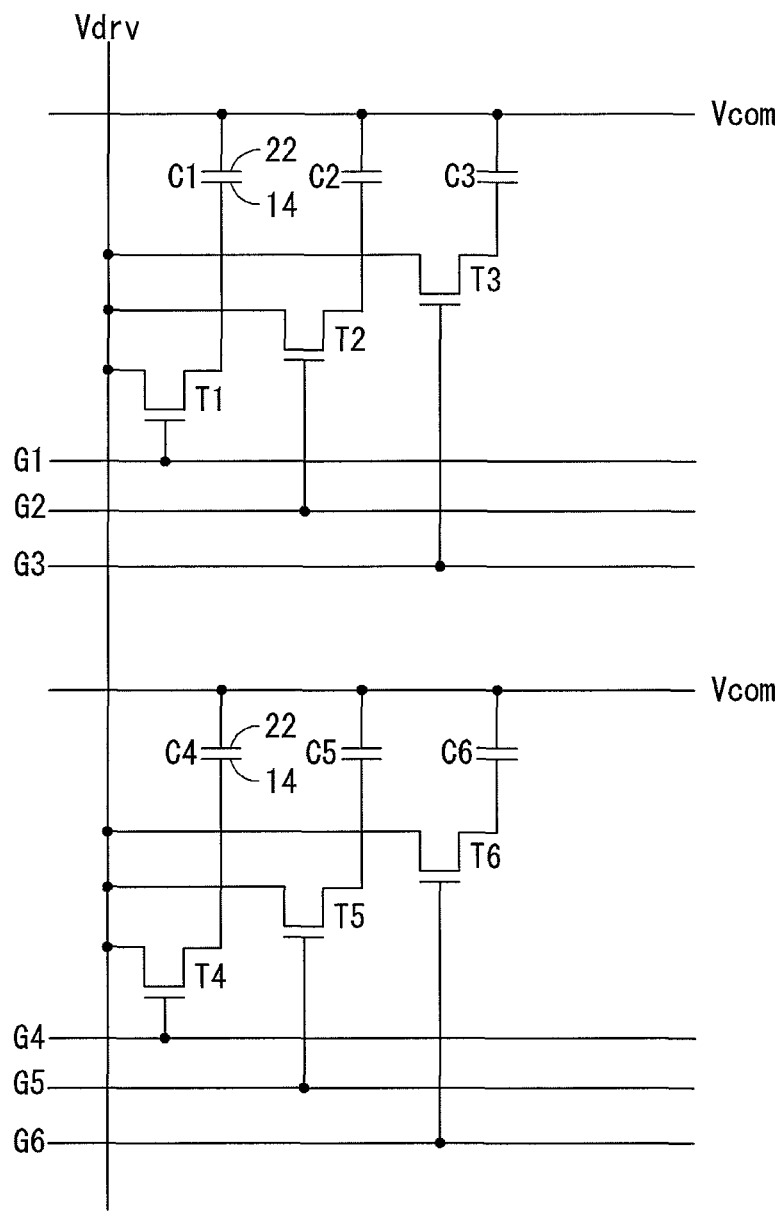
FIG. 18 is a circuit diagram showing switching elements of the 3D cell of the autostereoscopic display.

The driving voltage Vdrv may be applied to the 3D cell 200 using switching elements shown in FIG. 18.

As shown in FIG. 18, cells C1 to C6 of the 3D cell 200 include the divided lower electrodes 14a and 14b, the upper electrode 22 to which the common voltage Vcom is applied, and the liquid crystal layer 18 formed between the lower electrodes 14a and 14b and the upper electrode 22. The liquid crystal molecules of the 3D cell 200 are driven by an electric field generated by a difference between the driving voltage Vdrv applied to the divided lower electrodes 14a and 14b and the common voltage Vcom applied to the upper electrodes 22, thereby forming a barrier or a lens.

Transistors T1 to T6 are turned on in response to the gate pulse applied through gate lines G1 to G6 formed on the lower substrate 10 of the 3D cell 200. The transistors T1 to T6 supply the driving voltage Vdrv to the lower electrodes 14a and 14b of the cells C1 to C6 in an on-state. In the embodiment of the invention, the driving voltage Vdrv is applied as the voltage shown in FIGS. 11 to 13, 16, and 17, so as to prevent the flicker of the 3D cell 200 and AC-drive the liquid crystal molecules.

Figure 19:
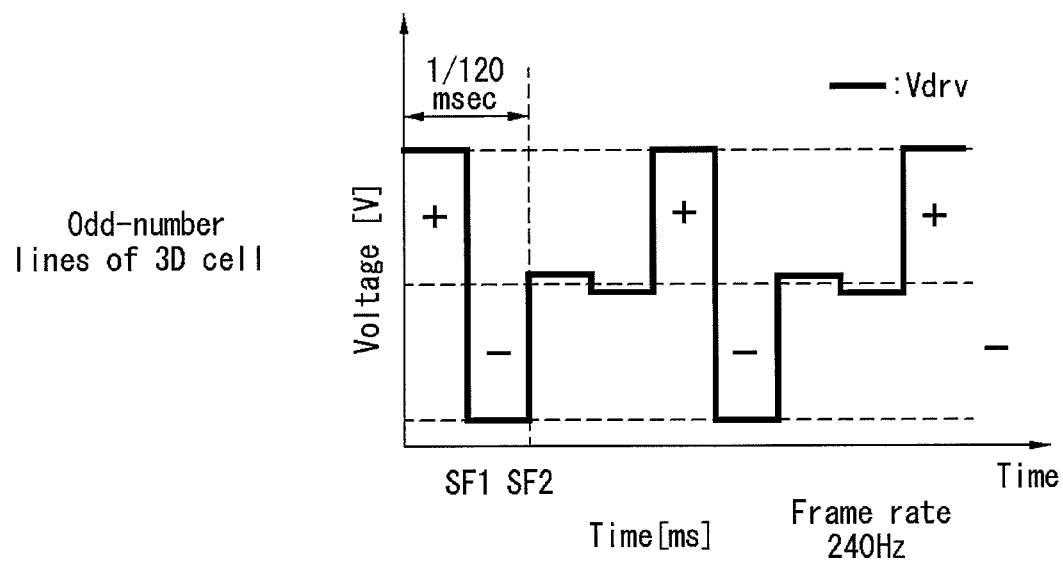
FIGS. 19 to 21 illustrate a driving voltage of a 3D cell and a liquid crystal response curve of a display panel in an autostereoscopic display according to a fourth embodiment of the present invention.
Figure 19:
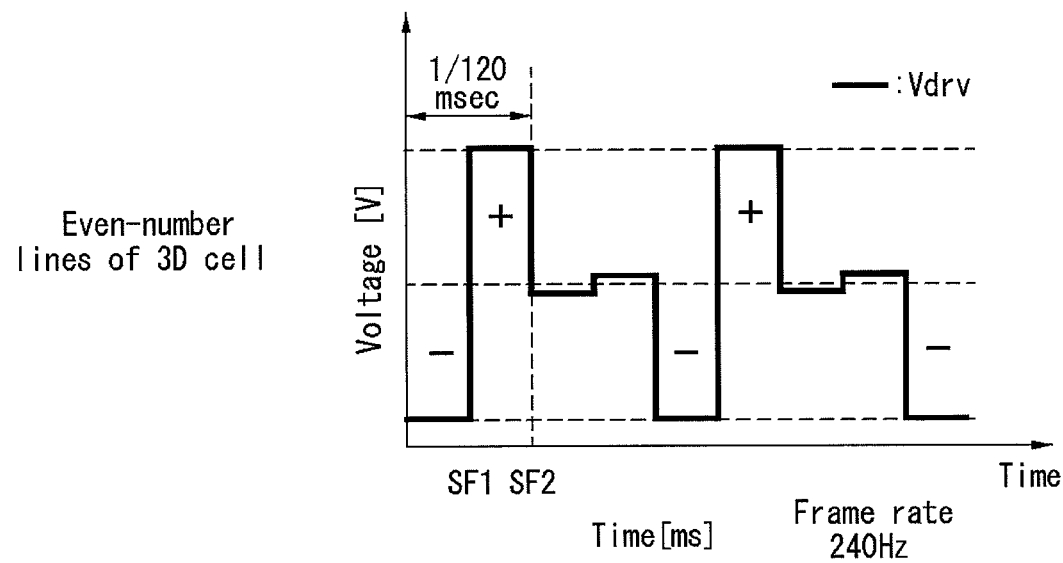
Figure 20:
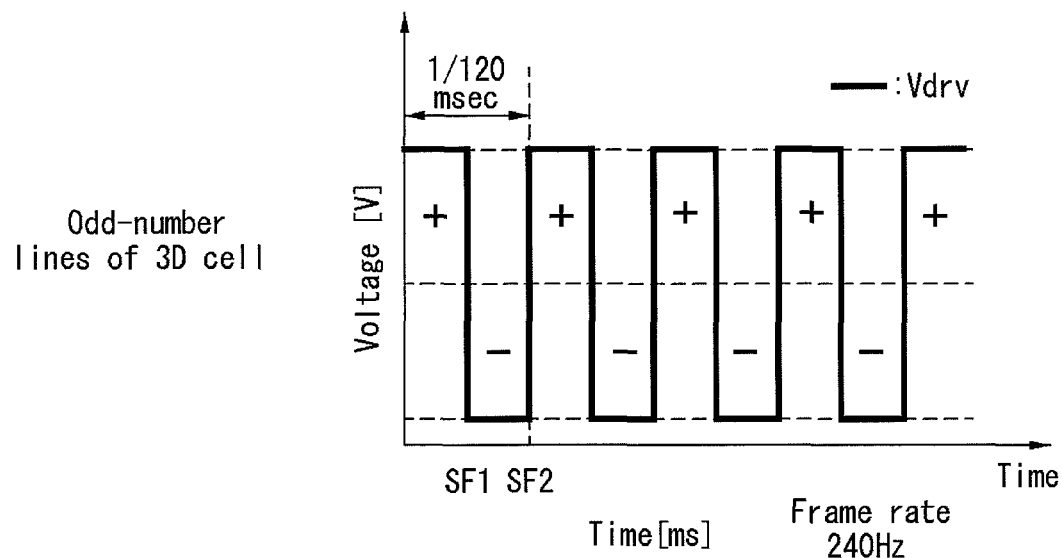
Figure 20:
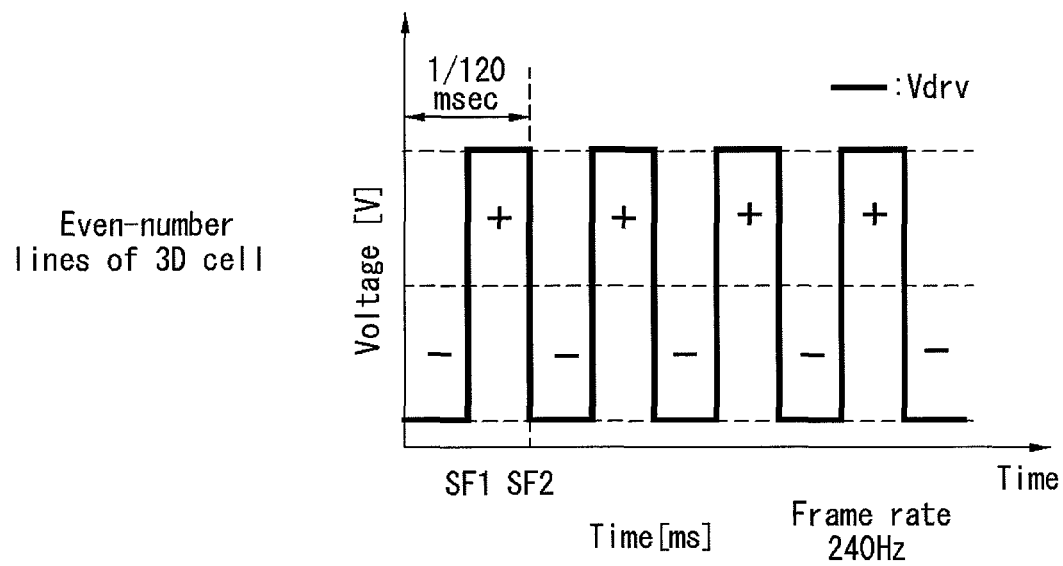
Figure 21:
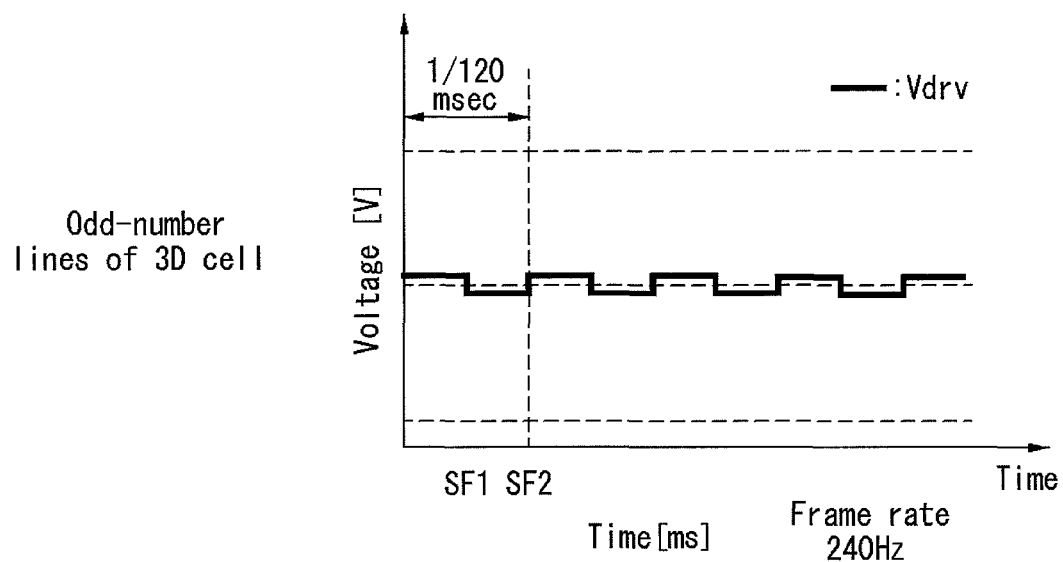
Figure 21:
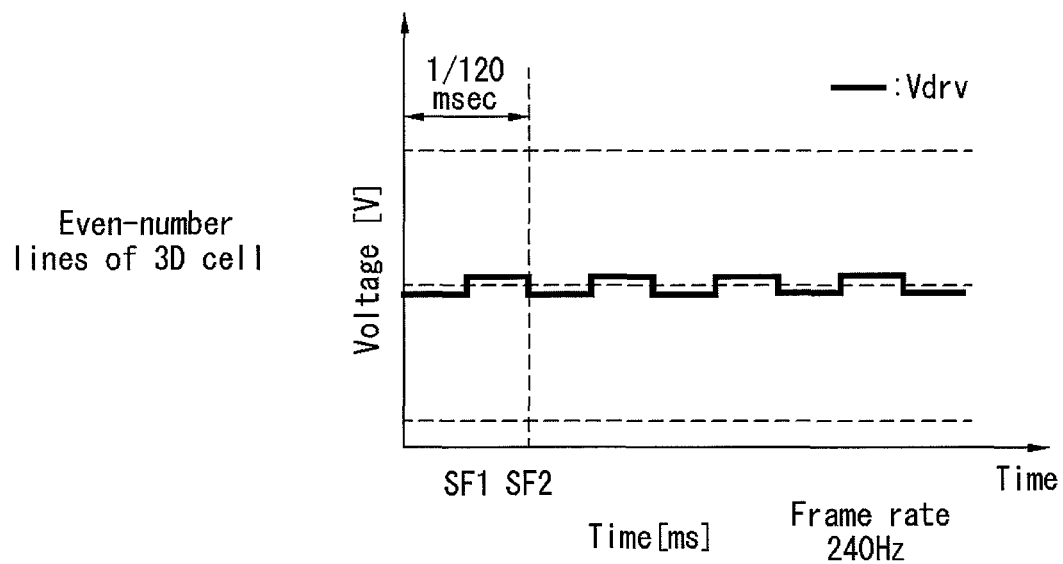

As shown in FIGS. 19 to 21, an autostereoscopic display according to a fourth embodiment of the present invention includes, for example, a driving voltage of a 3D cell and a liquid crystal response curve of a display panel.

As shown in FIG. 19, the driving voltages Vdrv, which are set to the voltages of different polarities, may be applied to the adjacent lines of the 3D cell 200. For example, the driving voltage Vdrv shown in an upper waveform diagram of FIGS. 19 to 21 may be applied to the cells C1 to C3 positioned on the odd-number lines of FIG. 18. Further, the driving voltage Vdrv shown in a lower waveform diagram of FIGS. 19 to 21 may be applied to the cells C4 to C6 positioned on the even-number lines of FIG. 18.

Accordingly, one of the advantages of the embodiments of the present invention is that the frame rate of the 3D cell to can be greater than the frame rate of the display panel, thereby preventing the flicker of the 3D cell.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An autostereoscopic display comprising: a display panel configured to display left eye image data and right eye image data based on an input image; a three-dimensional (3D) cell which is positioned on the display panel or is embedded in the display panel, wherein the 3D cell includes: a switchable barrier or a switchable lens configured to separate optical axes of a left eye image and a right eye image, a transparent upper electrode extending across the switchable barrier or the switchable lens, and a first set of transparent lower electrodes and a second set of transparent lower electrodes alternately arranged with a transparent insulating layer disposed between the first and second sets of transparent lower electrodes; and a timing controller configured to: shift the switchable barrier or the switchable lens and the left and right eye image data in synchronization during each frame period, and drive the switchable barrier or the switchable lens of the 3D cell at an operation frequency that is at least two times greater than an operation frequency of the display panel and at least four times greater than a frame rate of the input image and apply an alternating current (AC) driving voltage to the first and second sets of transparent lower electrodes within the 3D cell with a polarity that is inverted at a same frequency as the operation frequency of the 3D cell to move the switchable barrier or the switchable lens a shifted distance, wherein a flicker of the 3D cell and a flicker of the display panel are unsynchronized, wherein the flicker of the 3D cell and the flicker of the display panel are unsynchronized by driving the switchable barrier or the switchable lens with a periodic digital voltage waveform and driving the display panel with a periodic analog voltage waveform, and wherein a falling edge of the periodic analog voltage waveform driving the display panel occurs at a same time as every other rising edge of the periodic digital voltage waveform driving the switchable barrier or the switchable lens.

2. The autostereoscopic display of claim 1, wherein the operation frequency of the 3D cell is 200 Hz or 240 Hz.

3. The autostereoscopic display of claim 1, wherein the 3D cell is driven with four different voltage levels during each frame period.

4. The autostereoscopic display of claim 1, wherein the 3D cell is driven with a driving voltage that switches polarity twice during each frame period.

5. The autostereoscopic display of claim 1, wherein the display panel displays two images during each frame period.

6. The autostereoscopic display of claim 1, wherein voltages of different polarities are applied to adjacent lines in the 3D cell.

7. The autostereoscopic display of claim 1, wherein the flicker of the 3D cell and the flicker of the display panel are unsynchronized by driving the switchable barrier or the switchable lens with a periodic digital voltage waveform and driving the display panel with a periodic analog voltage waveform, and
    wherein a falling edge of the periodic analog voltage waveform driving the display panel occurs and a rising edge of the periodic digital voltage waveform driving the switchable barrier or the switchable lens occur at different times.

8. The autostereoscopic display of claim 1, wherein the display panel simultaneously displays the left eye image data and the right eye image data.

9. A method for driving an autostereoscopic display including a display panel displaying left eye image data and right eye image data based on an input image, and a three-dimensional (3D) cell which is positioned on the display panel or is embedded in the display panel to separate optical axes of a left eye image and a right eye image, the autostereoscopic display further including a timing controller configured to control the display panel and the 3D cell, the method comprising: shifting the left and right eye image data in each frame period; shifting a switchable barrier or a switchable lens of the 3D cell by adjusting a driving voltage of the 3D cell in synchronization with the shifting of the left and right image data; and driving the switchable barrier or the switchable lens of the 3D cell at an operation frequency that is at least two times greater than an operation frequency of the display panel and at least four times greater than a frame rate of the input image and applying an alternating current (AC) driving voltage to a first set of transparent lower electrodes and a second set of transparent lower electrodes alternately arranged with a transparent insulating layer disposed between the first and second sets of transparent lower electrodes within the 3D cell with a polarity that is inverted at a same frequency as the operation frequency of the 3D cell to move the switchable barrier or the switchable lens a shifted distance, wherein a flicker of the 3D cell and a flicker of the display panel are unsynchronized, wherein the flicker of the 3D cell and the flicker of the display panel are unsynchronized by driving the switchable barrier or the switchable lens with a periodic digital voltage waveform and driving the display panel with a periodic analog voltage waveform, and wherein a falling edge of the periodic analog voltage waveform driving the display panel occurs at a same time as every other rising edge of the periodic digital voltage waveform driving the switchable barrier or the switchable lens.

10. The method of claim 9, wherein the operation frequency of the 3D cell is 200 Hz or 240 Hz.

11. An autostereoscopic display comprising: a display panel comprising a pixel array arranged based on a crossing structure of data lines and gate lines and configured to display left eye image data and right eye image data based on an input image; a plurality of display panel drivers configured to supply data voltages to the data lines and the gate lines; a three-dimensional (3D) cell positioned on the display panel, wherein the 3D cell includes: a switchable barrier or a switchable lens configured to separate optical axes of a left eye image and a right eye image, a transparent upper electrode extending across the switchable barrier or the switchable lens, and a first set of transparent lower electrodes and a second set of transparent lower electrodes alternately arranged with a transparent insulating layer disposed between the first and second sets of transparent lower electrodes; a 3D cell driver configured to generate a driving voltage of the 3D cell; and a timing controller configured to: shift the switchable barrier or the switchable lens of the 3D cell and the left and right eye image data in synchronization during each frame period, and control the 3D cell driver to drive the 3D cell at an operation frequency that is at least two times greater than an operation frequency of the plurality of display panel drivers of the display panel and at least four times greater than a frame rate of the input image and apply an alternating current (AC) driving voltage to the first and second sets of transparent lower electrodes within the 3D cell with a polarity that is inverted at a same frequency as the operation frequency of the 3D cell to move the switchable barrier or the switchable lens a shifted distance, wherein a flicker of the 3D cell and a flicker of the display panel are unsynchronized, wherein the flicker of the 3D cell and the flicker of the display panel are unsynchronized by driving the switchable barrier or the switchable lens with a periodic digital voltage waveform and driving the display panel with a periodic analog voltage waveform, and wherein a falling edge of the periodic analog voltage waveform driving the display panel occurs at a same time as every other rising edge of the periodic digital voltage waveform driving the switchable barrier or the switchable lens.

12. The autostereoscopic display of claim 11, wherein the operation frequency of the 3D cell is 200 Hz or 240 Hz.

13. The autostereoscopic display of claim 11, wherein the driving voltage of the 3D cell is used to adjust the refractive index of the switchable lens.

14. The autostereoscopic display of claim 11, wherein the switchable barrier is used to adjust a transmittance of the 3D cell.

15. The autostereoscopic display of claim 14, wherein the switchable barrier blocks light to the 3D cell by applying a black gray voltage of the 3D cell.

16. The autostereoscopic display of claim 11, wherein the switchable lens or the switchable barrier includes a birefringent medium, and is driven by the 3D cell driver to separate optical axes of a left eye image and a right eye images.

17. A method for driving an autostereoscopic display, the method comprising: displaying left eye image data and right eye image data based on an input image by a display panel including a pixel array arranged based on a crossing structure of data lines and gate lines; shifting the left and right eye image data during each frame period; shifting a switchable barrier or a switchable lens of a three dimensional (3D) cell positioned on the display panel in synchronization with the shifting of the left and right eye image data by adjusting a driving voltage of the 3D cell; and driving the switchable barrier or the switchable lens of the 3D cell at an operation frequency that is at least two times greater than an operation frequency of the display panel and at least four times greater than a frame rate of the input image and applying an alternating current (AC) driving voltage to a first set of transparent lower electrodes and a second set of transparent lower electrodes alternately arranged with a transparent insulating layer disposed between the first and second sets of transparent lower electrodes within the 3D cell with a polarity that is inverted at a same frequency as the operation frequency of the 3D cell to move the switchable barrier or the switchable lens a shifted distance, wherein a flicker of the 3D cell and a flicker of the display panel are unsynchronized, wherein the flicker of the 3D cell and the flicker of the display panel are unsynchronized by driving the switchable barrier or the switchable lens with a periodic digital voltage waveform and driving the display panel with a periodic analog voltage waveform, and wherein a falling edge of the periodic analog voltage waveform driving the display panel occurs at a same time as every other rising edge of the periodic digital voltage waveform driving the switchable barrier or the switchable lens.

18. The method of claim 17, wherein the operation frequency of the 3D cell is 200 Hz or 240 Hz.

19. The method of claim 17, further comprising:
applying, via a 3D cell driver connected to the 3D cell, the driving voltage to the switchable lens to adjust a refractive index of the switchable lens.

* * * * *